US007424946B2

(12) United States Patent
Filippi et al.

(10) Patent No.: US 7,424,946 B2

(45) Date of Patent: Sep. 16, 2008

(54) ROLLER CLEANING SYSTEM

(75) Inventors: Enrico Filippi, Genoa (IT); Gabriele Pastorini, Predosa-Alessandria (IT)

(73) Assignee: Techint Compagnia Tecnica Internazionale S.p.A., Milan (IT)

( * ) Notice: Subject to any disclaimer, the term of this patent is extended or adjusted under 35 U.S.C. 154(b) by 132 days.

(21) Appl. No.: 10/582,044

(22) PCT Filed: Dec. 14, 2004

(86) PCT No.: PCT/EP2004/014308

§ 371 (c)(1), (2), (4) Date: Jun. 7, 2006

(87) PCT Pub. No.: WO2005/059463

PCT Pub. Date: Jun. 30, 2005

(65) Prior Publication Data

US 2007/0144869 A1 Jun. 28, 2007

(30) Foreign Application Priority Data

Dec. 18, 2003 (IT) .......................... MI2003A2504

(51) Int. Cl.
*B21B 45/02* (2006.01)
*B65G 45/12* (2006.01)

(52) U.S. Cl. ....................... 198/498; 198/497; 451/424; 15/256.51

(58) Field of Classification Search ................. 198/497, 198/498; 15/256.51, 256.53; 451/428, 426, 451/424
See application file for complete search history.

(56) References Cited

U.S. PATENT DOCUMENTS 1,246,535 A * 11/1917 Chisnall .................. 15/256.53
1,741,494 A * 12/1929 Banfield ..................... 451/348
5,893,450 A * 4/1999 Metivier ..................... 198/496

FOREIGN PATENT DOCUMENTS

DE 341066 A * 9/1985

* cited by examiner

*Primary Examiner*—Mark A Deuble
(74) *Attorney, Agent, or Firm*—James V. Costigan; Hedman & Costigan, P.C.

(57) ABSTRACT

A roller cleaning system (10) for an oven (20) equipped with a series of motorized rollers (21) each of which is in turn connected to a relative motor-reducer (24) for rotation activation, in turn connected to a relative frequency converter (25) driven by a respective control and activation device (26), said roller cleaning system (10) comprising a control and regulation unit (14) to independently control the rotation rate and direction of each roller of the series of motorized rollers (21) for the advancing of one or more flat blooms (40) and for cleaning at least one roller (34) causing the detachment of the flakes of oxide therefrom by scraping it against a flat bloom (40) with a variation in the rotation rate and/or direction of the same.

4 Claims, 5 Drawing Sheets

ROLLER CLEANING SYSTEM

The present invention relates to a roller cleaning system, which can be used in particular for removing flakes of oxide from the riders of the rollers of a heating oven for flat blooms or similar products to be laminated.

In the steel industry, in the lamination of flat products, the use of fine casting plants with the use of roller ovens for direct lamination, is becoming increasing more widespread.

These plants envisage a heating oven for flat blooms or similar products to be laminated, positioned immediately downstream of continuous casting for transferring the flat blooms or similar products to a rolling mill, designed for optimizing the heating temperature of the flat blooms themselves.

The rolling mill is also situated downstream of the oven. The physical transfer of the flat blooms to the inside of said heating ovens is effected by means of a series of motorized rollers, from which the term "roller oven" derives.

Roller ovens also allow the moving and temporary residing of the flat blooms inside said ovens in the case of unexpected stoppages of the rolling mill, without having to interrupt a continuous casting underway.

A typical roller oven has a series of motorized rollers, for example a roller oven of about two hundred motorized rollers extends for approximately 250 linear metres.

The moving of the flat blooms inside the roller oven is specifically effected by means of the series of motorized rollers.

They are designed for optimizing the heating of the flat blooms, at the same time minimizing the thermal exchange between the series of rollers and the flat blooms, during their residence inside the oven.

For this purpose, each roller is equipped with a series of metal riders, situated on the outer surface and suitable for supporting the flat blooms and conferring their advance movement.

Each roller, moreover, is equipped with a motor-reducer capable of activating its rotation at any pre-established rate by means of a control and regulation device and a frequency converter, both connected to the motor-reducer itself.

During their residence in the heating roller oven, the flat blooms undergo hot oxidation which causes the formation of a surface layer of oxide, which grows with time, for the period the flat bloom remains in the oven.

One of the drawbacks that can occur in roller ovens is that the layer of oxide can break, creating flakes which subsequently adhere to the series of riders of each motorized roller.

Another disadvantage is that a continuation of this process leads to the formation of an additional layer on the surface of the series of riders which damages the flat blooms and their subsequent lamination.

In order to limit these problems, it is possible to minimize the formation of flakes, by optimizing the heating temperatures of the flat blooms inside the various sections of the roller oven.

Another method is to reduce the time and residence temperature of the flat blooms inside the roller ovens, at the same time minimizing the infiltrations of air inside the oven itself.

A solution to the problem of flakes of oxide is to clean the series of riders of each motorized roller, by means of manual plant maintenance operations.

One of the drawbacks of this solution is that it requires a great deal of time and furthermore there is no guarantee that the re-establishment of the motorized rollers will provide a good quality of laminated flat blooms, as this type of operation is quite complex and complicated and requires an extremely long period of time for obtaining the best results.

Another solution envisages substitution of the motorized rollers.

One of the disadvantages of this solution is that it is extremely onerous in economical terms.

Another drawback is that it is extremely onerous in terms of time necessary for substituting the rollers themselves.

An objective of the present invention is to provide a roller cleaning system for a roller oven capable of operating during the functioning of the roller oven itself.

A further objective of the present invention is to provide a roller cleaning system for a roller oven that is efficient and allows use of the roller oven without interruptions, obtaining good quality flat blooms or other similar structural sections.

Yet another objective is to provide a system and process for the cleaning of the rollers of a roller oven which is simple and economical.

The general objective of the present invention is to solve the above drawbacks of the known art in an extremely simple, economical and particularly functional way.

An additional objective is to provide a roller cleaning system capable of removing the flakes of oxide from the rollers of a roller oven.

Yet another objective is to indicate a process for the cleaning of the rollers of a roller oven which is efficient and practical.

In view of the above objectives, according to the present invention, a roller cleaning system has been conceived, having the characteristics specified in the enclosed claims.

The structural and functional characteristics of the present invention, as also its advantages with respect to the known art, will appear more evident from an examination of the following description, referring to the enclosed drawings, which illustrate a roller cleaning system according to the innovative principles of the invention itself.

In the drawings:

FIG. 1 shows a raised side view of a roller of a roller oven;

FIGS. 2*a,* 2*b* and 2*c* are raised side views of the roller of FIG. 1 in successive resident times in a roller oven;

FIGS. 3*a* and 3*b* are raised side view of a roller of a first preferred embodiment of a roller cleaning process according to the present invention in successive time periods;

Figure 1:
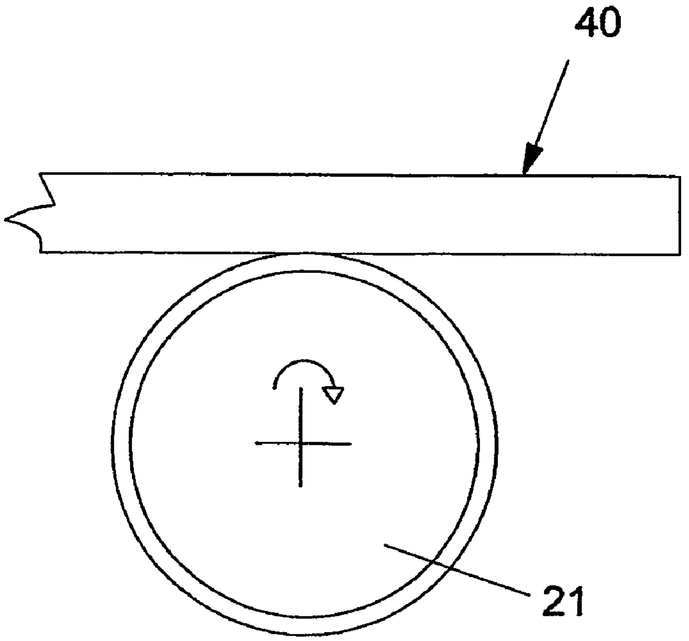
Figure 2A:
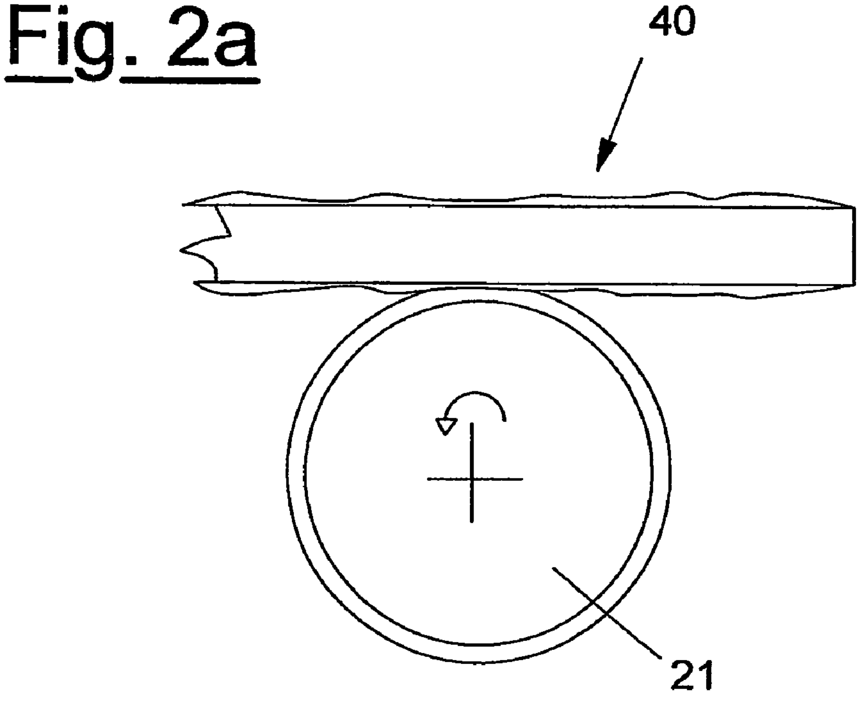
Figure 2B:
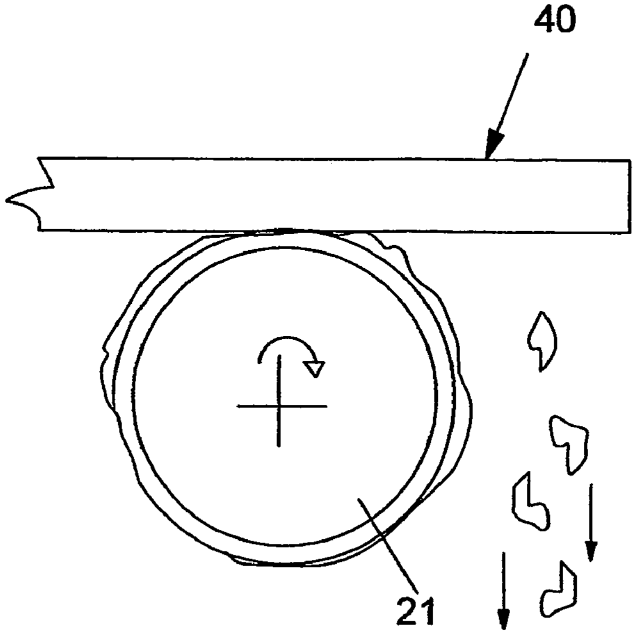
Figure 2C:
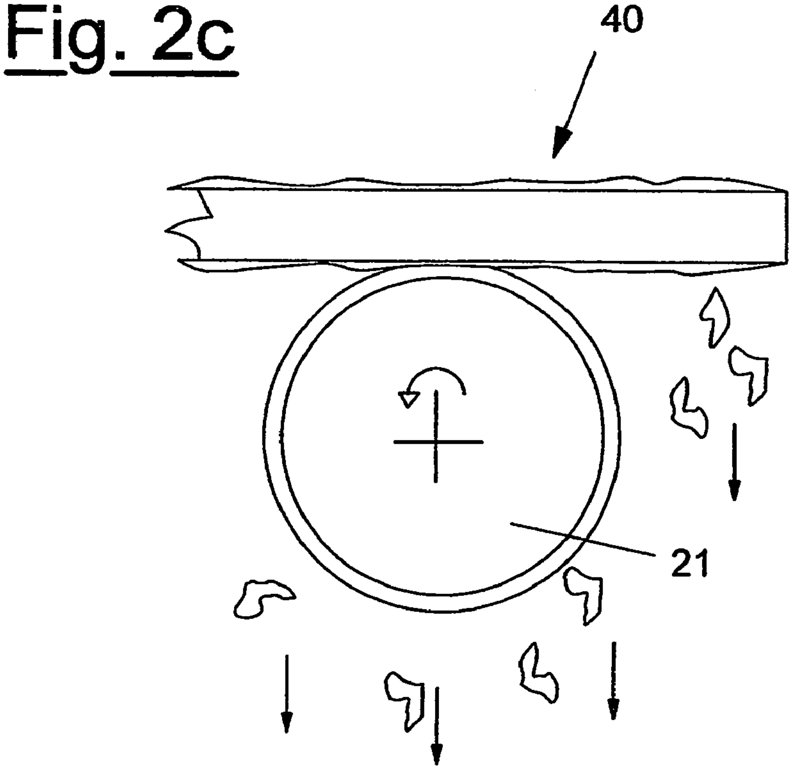

With reference to the drawings, a roller cleaning system is indicates as a whole with 10, and in the example illustrated, according to the present invention, comprising a control and regulation unit 14 which is preferably connected by means of a field bus 12 to relative control and activation devices 26 at a PLC, each of which is in turn connected to a motor 24 of a respective roller 21 by means of a frequency converter 25 (Inverter) which controls the rotation rate of the motor 24 itself.

Said cleaning system 10 is applied to a roller oven 20 equipped with a series of rollers 21 activated in rotation by the respective motors 24.

According to a preferred embodiment of the present invention, by means of the control and regulation unit 14, the roller cleaning system 10, is capable of independently driving each motorized roller of the series of rollers 21, modifying, with time, its rotation rate and/or rotation direction regardless of the remaining motorized rollers of the series of motorized rollers 21.

According to another aspect of the present invention, a process is provided for the cleaning of the rollers of a roller oven, to eliminate the flakes of oxide which are deposited on a series of riders of at least one roller 34 of a roller oven comprising a series of rollers 21 of which a group of rollers 22 is dedicated to a flat bloom 40 or with a similar steel structure.

The rotation of each roller 21 can be activated independently of the remaining rollers of the series of rollers 21 by means of activating devices.

The roller cleaning process comprises the following phase:

a) activating the rotation of at least one roller 34 of at least one group of rollers 22 with a module rate and/or direction sufficient for causing at least one roller 34 to scrape against the flat bloom 40 so as to remove the flakes of oxide from at least one roller 34.

This is effected by the mechanical action of the flat bloom 40 on at least one roller 34 generated by the rate difference between the rate of at least one roller 34 of the group of rollers 22 itself and the rate of the flat bloom 40 itself which advances with the peripheral rate of the remaining rollers of the group of rollers 22.

In particular, the flat bloom 40 is used to detach the flakes of oxide from a series of riders positioned on at least one roller, as if it were a tool.

According to the process of the present invention, it is possible to activate one or more rollers, even in groups, with a different rate in the module and/or direction, as, for detaching the flakes of oxide, the difference in rate, between the advance rate of the flat bloom and the peripheral rate of the roller or rollers activated with a different rate and from which the flakes of oxide deposited on the series of riders of the rollers themselves must be detached, is important.

The difference in rate coupled with the friction existing between the riders, creates forces capable of causing scraping between the riders and flat bloom, thus detaching the flakes of oxide from the same riders, until they drop onto the bottom of the roller oven 20.

Figure 3A:
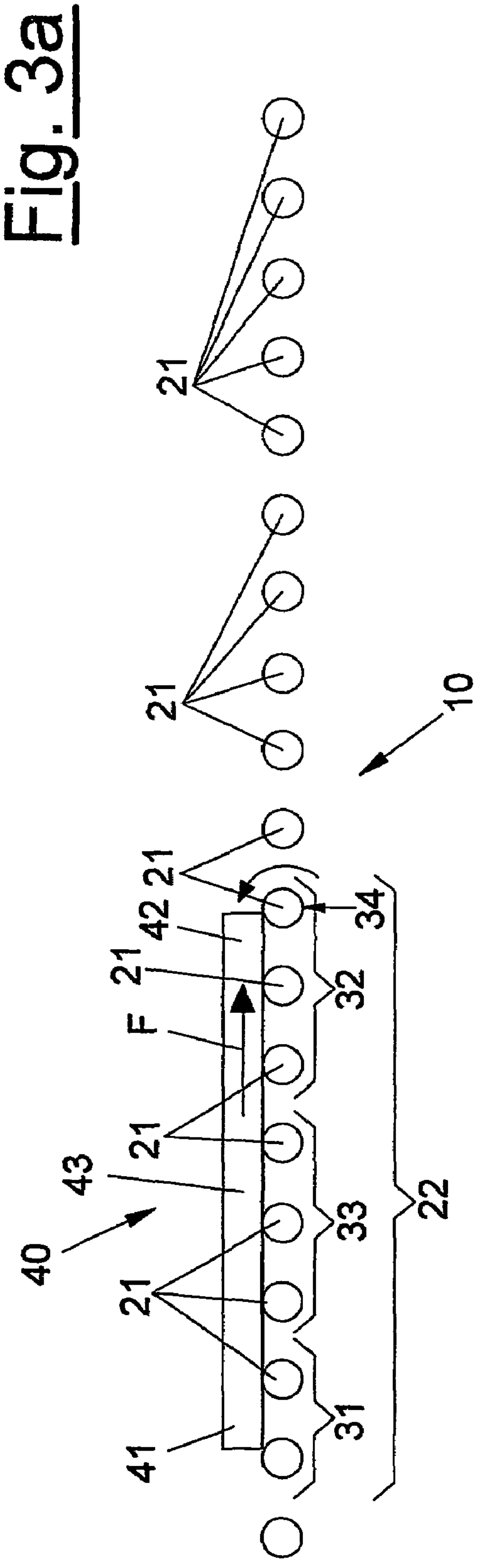
Figure 3B:
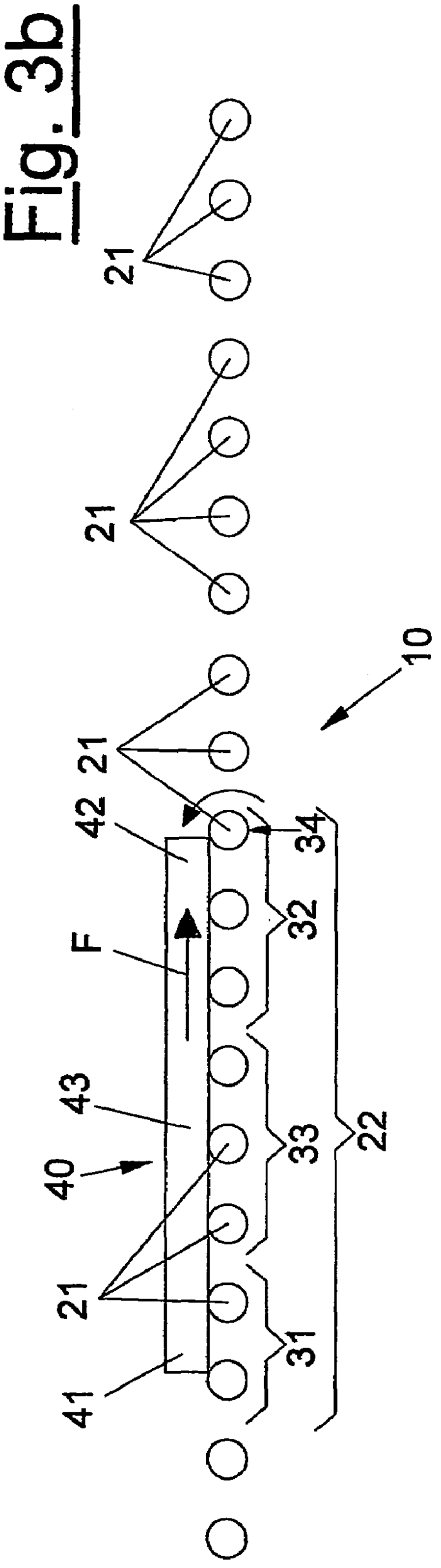
Figure 4:
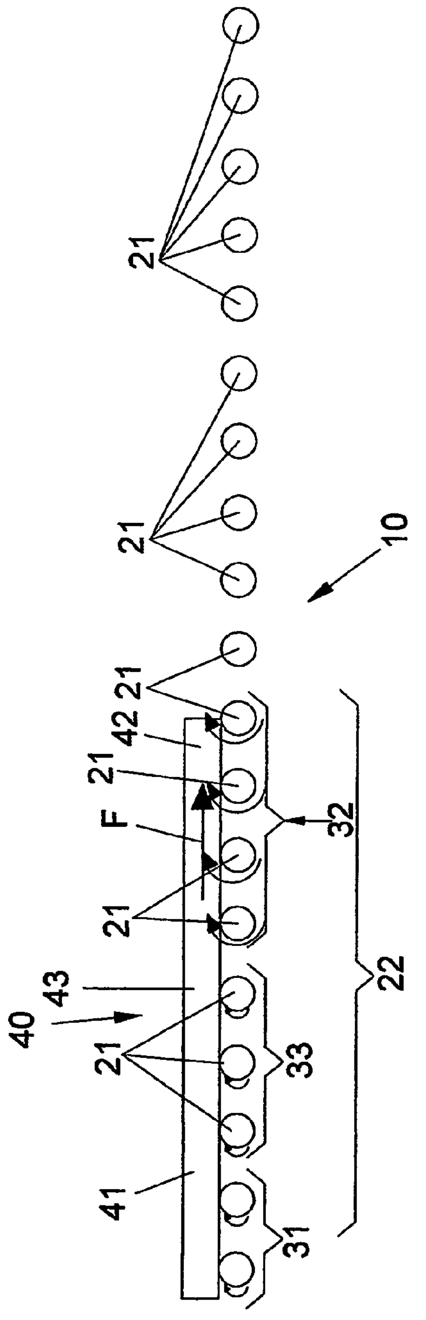
FIG. 4 is a raised side view of a second preferred embodiment of a roller cleaning process according to the present invention.
Figure 5:
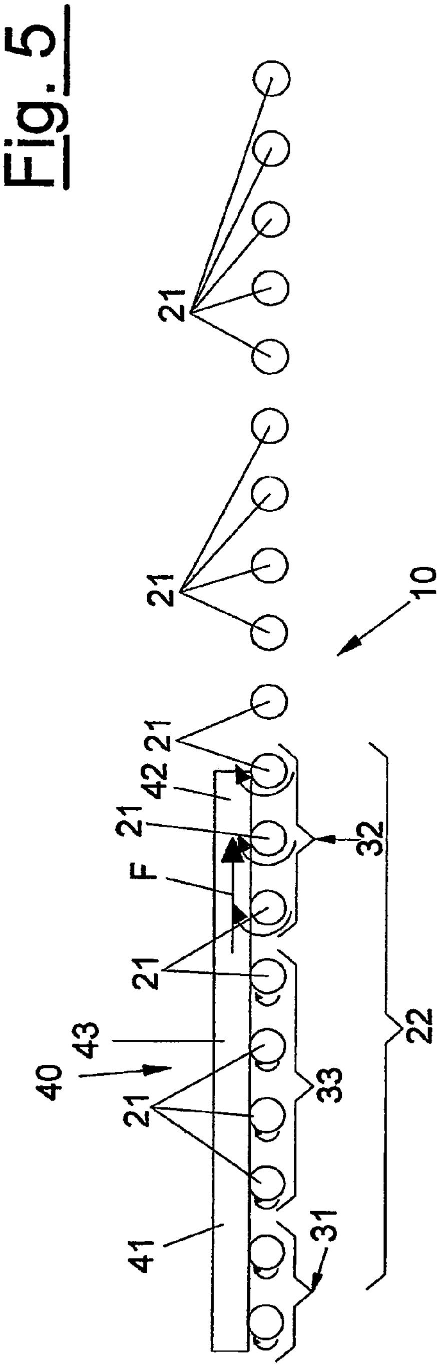
FIG. 5 is a raised side view of a third preferred embodiment of a roller cleaning process according to the present invention.
Figure 6:
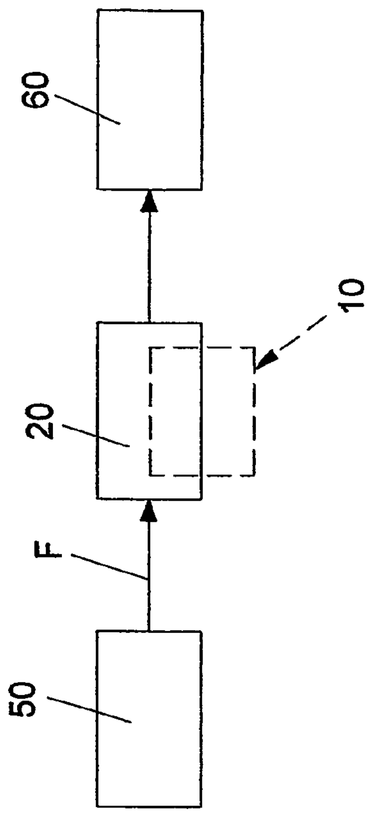
FIG. 6 is a raised side schematic view of a roller oven equipped with a system according to the present invention and connected to a continuous casting plant and a rolling mill.
Figure 7:
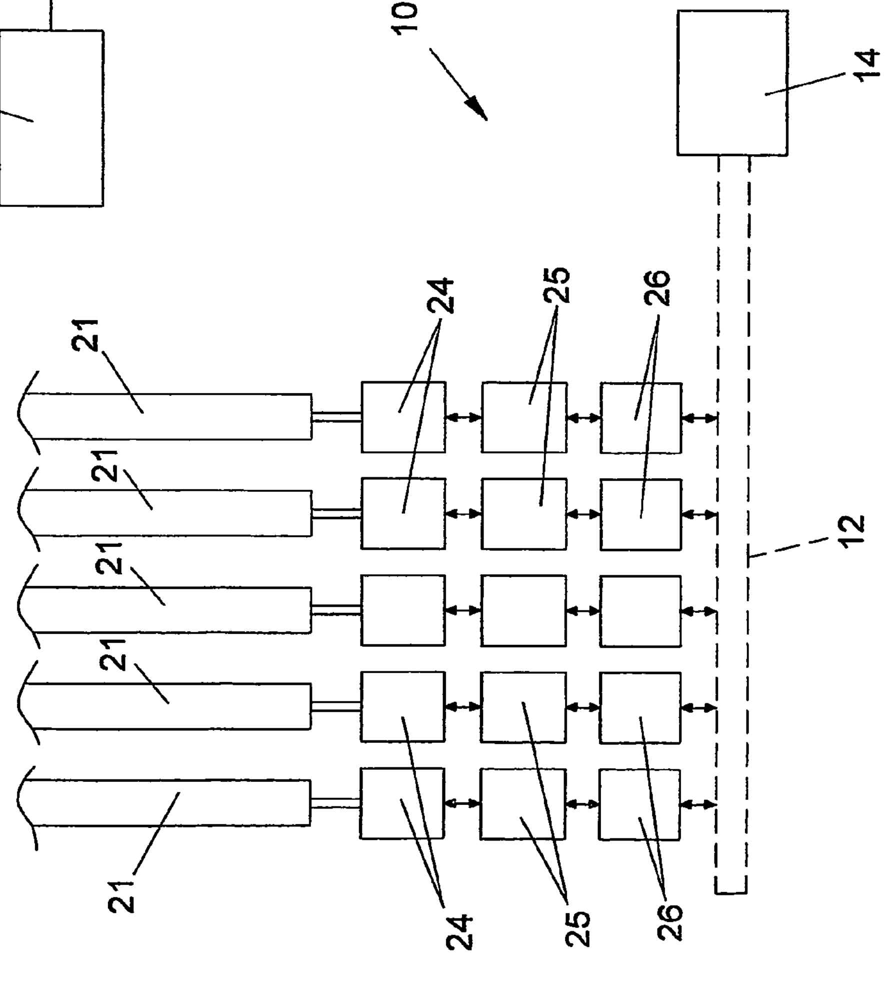
FIG. 7 is a raised side view of a preferred embodiment of a cleaning system according to the present invention.

With reference to FIGS. 3*a*, 3*b*, 4 and 5, these show a series of rollers 21 comprising a group of rollers 22 which come into contact with a flat bloom 40 causing its movement.

Said flat bloom 40 is conveyed by the group of rollers 22 and advances in an advance direction F towards a rolling mill 60.

The flat bloom 40 has a tail portion 41 further away from the rolling mill 60, a central portion 43 and a head portion 42 nearer to the rolling mill 60.

The tail portion 41 is conveyed by a group of tail rollers 31, the central portion of the flat bloom 40 is, on the other hand, conveyed by a group of central rollers 33, whereas the head portion is conveyed by a group of head rollers 32, respectively.

During the moving of the flat bloom 40, the rollers of the group of rollers 22 in contact with the flat bloom 40 are obviously not the same.

Furthermore, the rotation of each roller of the series of rollers 21 can be activated with different rotation rates and with either a clockwise or anticlockwise direction, for the advancing or slowing down of the flat bloom 40.

In other words, the roller cleaning system 10 is applied to an oven 20 equipped with a series of motorized rollers 21 each of which is in turn connected to a relative motor 24 for rotational activation in turn connected to a relative frequency converter 25 driven by a respective control and activation device 26.

The roller cleaning system 10 comprises a control and regulation unit 14 in order to independently control the rotation rate and direction of each roller of the series of motorized rollers 21 for the advancing of one or more flat blooms 40 and for cleaning at least one roller 34, causing the detachment of the flakes of oxide therefrom by its scraping against a flat bloom 40, by a variation in its rotation rate and/or direction.

The roller cleaning system 10 therefore preferably comprises a field bus 12 which connects said control and regulation unit 14 to each control and activation device 26.

According to a first preferred embodiment of the process for the cleaning of the rollers of a roller oven 20, the at least one roller 34 is a roller of the head group of rollers 32, and phase a) comprises:

- activation of the rotation of at least one roller (34) of at least one group of rollers (22) with a module and/or direction rate which is such as to cause the scraping of at least one roller (34) against the flat bloom (40) so as to remove the flakes of oxide from the at least one roller (34).

Phase a) preferably envisages activation of the rotation of at least one roller of the group of head rollers 32 with a rotation direction which opposes the advancing of the flat bloom 40 in the advance direction F towards the rolling mill 60, and activation of the rotation of the remaining group of rollers 22 in contact with the flat bloom 40 with a rotation rate which is such as to allow the flat bloom 40 to advance in the direction F with a lower module rate than that of the at least one roller 34.

Said at least one roller 34 has a rate difference which is such as to cause the scraping of the outer surface of the at least one roller 34 with respect to the flat bloom 40 with the consequent detachment of the flakes of oxide from the outer surface of the at least one roller 34, in particular from the contact surface of the series of riders of the at least one roller 34 with the flat bloom 40.

In this case, the parameters which can be established by an operator of the control and regulation unit 14 are:

- rate slow-down percentage of the flat bloom. The range admitted varies from 30 to 100% (100%=nominal rate of the flat bloom with the cleaning system not functioning);
- countercurrent rate increase percentage of the motor-roller to be cleaned, with respect to the movement rate of the flat bloom. The field admitted varies from 0 to −130% (countercurrent rotation);
- limit of current absorbed by the motorized rollers (measured in Ampère). The range admitted must be limited to a maximum of 90% of the minimum value between: the maximum current which can be supplied by the frequency converter and the maximum current which can be absorbed by the motor-roller;
- range of use inside the oven, meaning the quantity of rollers on which said process is to be applied;
- cleaning time of the motorized rollers. The time period for effecting the cleaning can be established by the operator from 0 seconds to the mechanical tolerance limit of the motorized rollers, which depends on the single plant and is specified in the operating files.

According to a second preferred embodiment of the process for the cleaning of the rollers of a roller oven 20, the at least one roller 34 is the group of head rollers 32 and phase a) preferably comprises:

b) activating the rotation of the group of head rollers 32 with a rotation rate which is such as to allow the flat bloom 40 to advance in the direction F;

c) activating the rotation of the group of tail rollers 31 and the group of central rollers 33 with a lower module rate than that of the group of head rollers 32 and with the same rotation direction:

Phase c) of the cleaning process preferably envisages:

activating the rotation of the group of central rollers 33 and the group of tail rollers 31 with the same module and direction rotation rate.

It is advantageously possible to exert a traction of the head portion 42 of the flat bloom 40 in its advance direction F, preventing the flat bloom 40 from veering and also avoiding the possible scratching of the flat bloom 40 on the part of the flakes of oxide present on the series of riders of the series of rollers 22 in contact with the flat bloom 40 itself.

In this case, the parameters that can be established by an operator of the control and regulation unit 14 are:

percentage of motorized rollers engaged under the head of the flat bloom whose the rate set point is to be varied;

minimum quantity of motorized head rollers engaged in the function;

rate increase percentage, with respect to the nominal movement rate of the flat bloom. The range admitted varies from 100% to +130% (100%=nominal rate of the flat bloom);

limit of the current absorbed by the motorized rollers (measured in Ampère). The range admitted must be limited to a maximum of 90% of the minimum value between: the maximum current which can be supplied by the frequency converter and the maximum current absorbed by the motor-roller;

selection of the number of flat blooms of a casting to which the system should be applied;

activation of the function on flat blooms in the casting phase;

activation of the function on flat blooms in the oscillating phase;

activation of the function on the first flat bloom in the casting phase;

activation of the function on the last flat bloom in the casting phase;

range of use inside the oven, meaning the quantity of rollers to which said process is to be applied.

Phase c) of the cleaning process preferably envisages:

activation of the group of central rollers 33 with a lower module rotation rate than the rotation rate of the head group of rollers 32;

activation of the group of tail rollers 31 with a lower module rotation rate than the rotation rate of the central group of rollers 33.

In this way, the cleaning of the rollers 22 is effected both at the head and tail as the difference in rate with respect to the rotation rate of the central group of rollers 33 higher frictional force having a component tangent with the outer surface of the rollers which is such as to cause scraping between each roller of the tail group of rollers 31 and the group of head rollers 32 respectively with the flat bloom 40, with the consequent detachment, by scraping, of the flakes of oxide from the surface of the rollers, in particular from the outer contact surface of the series of riders with the quarto plate 40.

In this case, the parameters that can be established by an operator of the control and regulation unit 14 are:

percentage of motorized rollers engaged under the head of the flat bloom whose rate set point is to be varied;

minimum quantity of motorized head rollers engaged in the function;

rate increase percentage, with respect to the nominal movement rate of the flat bloom. The range admitted varies from 100% to +130% (100%=nominal advance rate of the flat bloom);

percentage of motorized rollers engaged under the tail of the flat bloom whose rate set point is to be varied;

minimum quantity of motorized tail rollers engaged in the function;

rate reduction percentage, with respect to the nominal movement rate of the flat bloom. The range admitted varies from 70% to +100% (100%=nominal rate of the flat bloom);

limit of the current absorbed by the motorized rollers (measured in Ampère). The range admitted must be limited to a maximum of 90% of the minimum value between: the maximum current which can be supplied by the frequency converter and the maximum current absorbed by the motor-roller;

possibility of application to the head motorized rollers only or to the tail motorized rollers only;

selection of the number of flat blooms of a casting to which the system should be applied;

activation of the function on flat blooms in the casting phase;

activation of the function on flat blooms in the oscillating phase;

activation of the function on the first flat bloom in the casting phase;

activation of the function on the last flat bloom in the casting phase;

range of use inside the oven, meaning the quantity of rollers to which said process is to be applied.

From what is described above with reference to the figures, it is evident how a roller cleaning system according to the invention is particularly useful and advantageous. The objective mentioned in the preamble of the description is thus achieved.

The forms of the roller cleaning system of the invention, as also the materials, can obviously differ from that shown for purely illustrative and non-limiting purposes in the drawings.

The protection scope of the invention is therefore delimited by the enclosed claims.

The invention claimed is:

1. A roller cleaning process for a roller oven comprising a series of rollers (21) of which a group of rollers (22) is connected to a flat bloom (40) or similar steel structure, the rotation of each roller (21) can be activated independently of the remaining rollers of the series of rollers (21) by means of activation devices, characterized in that said roller cleaning process comprises the following phases: a) activating the rotation of at least one roller (34) of the at least one group of rollers (22) with a module and/or direction rate which is such as to cause the scraping of at least one roller (34) against the flat bloom (40) so as to remove the flakes of oxide from the at least one roller (34) wherein phase a) comprises the following phases: activating the rotation of at least one roller of the head group of rollers (32) with a rotation direction which opposes the advancing of the flat bloom (40) towards a rolling mill (60); activating the rotation of the remaining rollers of the group of rollers (22) in contact with the flat bloom (40) with a rotation rate which is such as to cause the advancing of the flat bloom (40) in the direction (F) with a lower module rate than that of the at least one roller (34).

2. The roller cleaning process according to claim 1, characterized in that said series of rollers (21) comprises a group of rollers (22) in contact with said flat bloom (40), in turn comprising a group of head rollers (32), a group of tail rollers (31) and a group of central rollers (33), and in that said phase a) comprises the following phases: b) activating the rotation of the group of head rollers (32) with a rotation rate which is such as to allow the flat bloom (40) to advance in the direction (F); c) activating the rotation of the group of tail rollers (31) and the group of central rollers (33) with a lower module rate than that of the group of head rollers (32) and with the same rotation direction.

3. The roller cleaning process according to claim 2, characterized in that phase c) of the cleaning process envisages: activating the group of central rollers (33) and the group of tail rollers (31) with the same module and direction rotation rate.

4. The roller cleaning process according to claim 2, characterized in that phase c) of the cleaning process envisages: activating the group of central rollers (33) with a lower module rate than that of the group of head rollers (32); activating the group of tail rollers (31) with a lower module rate than that of the group of central rollers (33).

* * * * *